United States Patent
Gschwender et al.

(10) Patent No.: US 12,411,385 B2
(45) Date of Patent: Sep. 9, 2025

(54) FUNCTIONAL-LAYER BLANK AND METHOD FOR CONTACTING A FUNCTIONAL-LAYER BLANK

(71) Applicant: Webasto SE, Stockdorf (DE)

(72) Inventors: Yannik Gschwender, Stockdorf (DE); Eva Huttner, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/646,401

(22) Filed: Apr. 25, 2024

(65) Prior Publication Data
US 2024/0361647 A1 Oct. 31, 2024

(30) Foreign Application Priority Data
Apr. 28, 2023 (DE) .................. 10 2023 111 079.9

(51) Int. Cl.
| | |
|---|---|
| G02F 1/1345 | (2006.01) |
| B32B 7/14 | (2006.01) |
| B32B 27/08 | (2006.01) |
| B32B 27/36 | (2006.01) |
| B60J 3/04 | (2006.01) |
| G02F 1/01 | (2006.01) |
| G02F 1/1343 | (2006.01) |
| B60J 3/00 | (2006.01) |

(52) U.S. Cl.
CPC .............. *G02F 1/1345* (2013.01); *B32B 7/14* (2013.01); *B32B 27/08* (2013.01); *B32B 27/36* (2013.01); *B60J 3/04* (2013.01); *G02F 1/0121* (2013.01); *G02F 1/13439* (2013.01); *B32B 2255/10* (2013.01); *B32B 2255/20* (2013.01); *B32B 2307/202* (2013.01); *B32B 2307/206* (2013.01); *B32B 2605/006* (2013.01); *B60J 3/007* (2013.01); *G02F 2203/01* (2013.01)

(58) Field of Classification Search
CPC .. G02F 1/1345; G02F 1/0121; G02F 1/13439; G02F 2203/01; B32B 7/14; B32B 27/08; B32B 27/36; B32B 2255/10; B32B 2255/20; B32B 2307/202; B32B 2307/206; B32B 2605/006; B60J 3/04
See application file for complete search history.

(56) References Cited

U.S. PATENT DOCUMENTS

| | | | | |
|---|---|---|---|---|
| 11,513,397 | B2* | 11/2022 | Huang | G02F 1/133761 |
| 2006/0061715 | A1* | 3/2006 | Tashiro | G02F 1/133753 |
| | | | | 349/114 |
| 2019/0056618 | A1* | 2/2019 | Xu | G02F 1/133512 |
| 2022/0100021 | A1 | 3/2022 | Yuan | |

OTHER PUBLICATIONS

Office Action issued against corresponding German Application No. 10 2023 111 079.9; mailed Nov. 27, 2023; In German with English Machine Translation (8 pages).

* cited by examiner

*Primary Examiner* — Anne M Hines
(74) *Attorney, Agent, or Firm* — Fitch, Even, Tabin & Flannery, LLP (57) ABSTRACT

A functional-layer blank which is used with a vehicle window in a shading arrangement, and to a method for contacting a functional-layer blank.

17 Claims, 4 Drawing Sheets

FUNCTIONAL-LAYER BLANK AND METHOD FOR CONTACTING A FUNCTIONAL-LAYER BLANK

CROSS-REFERENCE TO RELATED APPLICATION(S)

This application claims the benefit of German patent application no. 10 2023 111 079.9 filed on Apr. 28, 2023, which is incorporated herein by reference in its entirety.

TECHNICAL FIELD

The invention relates to a functional-layer blank and to a method for contacting such a functional-layer blank, in particular electrically, which is preferably used with a vehicle window, in particular in a shading arrangement.

BACKGROUND

A vehicle window having a functional-layer arrangement, for example a PDLC arrangement, in which a functional-layer blank is used, is known from the state of the art and is, for example, a roof element which is formed so as to be adjustable or fixed relative to a vehicle structure. The vehicle window is a composite component which has an outer window body and an inner window body. The outer window body forms an outer viewing area of the vehicle window and the inner window body forms an inner viewing area of the vehicle window. Between the outer window body and the inner window body, the PDLC (polymer-dispersed liquid crystal) arrangement is disposed, through which the entry of light through the vehicle window can be controlled. The PDLC arrangement can be switched between a blocking state, in which it works in the manner of a diffusor, and a transmission state, in which light can enter essentially undiffused through the vehicle window.

In general, the functional-layer arrangement comprises two plastic films, on whose inner sides a transparent, conductive coating is formed, and a liquid crystal layer which can be switched between the blocking state and the transmission state by applying corresponding voltages, said liquid crystal layer being disposed between the plastic films. The conductive coatings of the plastic films each form an electrode layer, which can be connected to a control unit and/or a voltage source by establishing a corresponding electric contact. An electric contact with the electrode layers is formed in particular at the lateral edges of the functional-layer arrangement.

In order to enable a roller blind effect and/or partial shading of the relevant vehicle window with such a functional-layer arrangement, it is preferable to segment the functional layer and the electrically conductive coatings in order to control individual segments of the functional-layer arrangement independently of each other and to switch back and forth between the blocking state and the transmission state. The individual segments increase the manufacturing effort required to provide the respective contacting.

In order to realize the contact, at least sections of the corresponding electroconductive coating must be exposed in the edge areas. Residue-free exposure of the electrically conductive coating of the plastic films of the functional-layer arrangement is currently only possible by subjecting the relevant electroconductive coating to mechanical processing, which can lead to impairment of and/or damage to the coating quality.

After the electrically conductive coating has been exposed and/or after cleaning off any functional layer polymer remaining on the electrically conductive coating, a tin busbar is usually applied by soldering or welding in the prior art to provide the respective electrical contact of the individual segments. This tin busbar is placed on the electrically conductive coating depending on the respective position and/or arrangement of the respective PDLC segments in order to be able to contact the individual PDLC segments or the individual segments of the electrically conductive coating segment by segment and thereby energize them. Furthermore, one wire per PDLC segment is inserted into the surrounding hot-melt adhesive and one end of the wire is soldered to the previously applied tin busbar using additional solder. The second end of each wire is also soldered to a connector, for example, a flexible printed circuit board (FPCB), using additional solder. The connector is then positioned in such a manner that in later use it is placed in an edge area of the vehicle window and can thus be connected to a voltage source and/or a control unit. Such an FPCB is usually connected by two individual electrical contact elements located on different levels of the functional-layer arrangement, so that the functional-layer arrangement has to be rotated during the connection process. The FPCB is usually connected to the functional-layer arrangement outside the liquid crystal layer by two separate contact elements, which increases both the cost and the complexity of the contact.

Additionally, when soldering or welding, the solder can only be applied slowly in segments, so that several soldering stations working in parallel are required to increase the production speed. This leads to an increase in capital costs and operating costs. In addition, the low flexibility of the solder can lead to the solder coming off in the further course of the process if, for example, the functional-layer arrangement has to be curved and/or moved in the further course of production. In addition, due to the material application, the soldered tin busbar can act as a barrier for the ventilation of the film composite in the further course of the process which can cause bubbles to form within the composite layer, among other things. This, in turn, leads to optical defects in the vehicle window.

Contacting the individual segments with wires also has several disadvantages. For each liquid crystal segment, a (single) wire must be inserted and/or embedded in a surrounding hot-melt adhesive, which requires high-precision work. In addition, the speed of the insertion process is limited. To increase this speed, several tool heads must be used, which increases capital costs and operating costs. In addition, it is not possible to insert wires in parallel, which means that several tool heads are required at different work stations. A defect in a wire also leads to the destruction of the entire film composite, so that in the case of an assembled vehicle window, the entire vehicle window ultimately has to be replaced in order to restore functionality. The contact points of the wires to the tin busbar are also located along the entire exposed area of the functional-layer arrangement, as each liquid crystal segment must be contacted with a wire. Each wire must also be soldered to two soldering points, which further increases the manufacturing effort.

SUMMARY

In view of the foregoing, it is the object of the invention to further develop a functional-layer blank and a method for contacting such a functional-layer blank.

According to the invention, this object is attained by a functional-layer blank having the features of claim 1. According to the invention, this object is also attained by a shading arrangement according to claim 13, a vehicle window according to claim 14 and a method having the features of claim 15.

Advantageous embodiments of the invention are the subject matter of the dependent claims. The invention relates to all combinations comprising at least two features disclosed in the description, the claims and/or the figures. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The invention proposes a functional-layer blank. The functional-layer blank is preferably used with a vehicle window in a shading arrangement, in particular a PDLC arrangement. The functional-layer blank is preferably a PDLC blank or a SPD (suspended particle device) blank or an LC (liquid crystal) blank. The functional-layer blank comprises a first support film having a first, preferably segmented, electrically conductive coating, a second support film having a second electrically conductive coating and a liquid crystal arrangement which is disposed between the two electrically conductive coatings. The first electroconductive coating is exposed in at least one surface area and at least sections of said first electrically conductive coating are removed in the exposed surface area for forming at least one insulating area in order to form at least one first segment of the first electrically conductive coating, said first segment being electrically insulated from the surrounding first electrically conductive coating electrically by means of the insulating area. The insulating area can also be formed by interrupting the first electrically conductive coating, for example using a knife, scraper and/or laser. At least one electroconductive conductor path extends from the first segment in the insulating area or at least partially on the first electrically conductive coating to a contacting area which is designed for electrically contacting the shading arrangement. The contacting area comprises a busbar which is connected to an electrical terminal of the shading arrangement by means of at least one connecting conductor path, the second electrically conductive coating being connected by said electrical terminal. At least sections of the at least one connecting conductor path are printed on and/or applied to the second support film in any other manner, for example by vapor deposition. Alternatively or additionally, it is possible that the electroconductive conductor path is not applied directly in the insulating area, but the first electrically conductive coating is structured in such a way that it is preserved where the conductor path extends and is nevertheless preferably electrically insulated from the other segments. The electrically conductive coating can be structured by cutting and/or lasering, for example. The conductor path can then be applied to an area of the electrically conductive coating that remains after structuring.

Furthermore, according to the invention, a method for contacting a functional-layer blank is proposed, which is used with a vehicle window, in particular in a shading arrangement, preferably a PDLC arrangement. The method comprises at least the following steps:

providing a processed functional-layer blank which comprises a first support film having a first, preferably segmented, electrically conductive coating, a second support film having a second electrically conductive coating, and a preferably segmented liquid crystal arrangement which is disposed between the two electrically conductive coatings;

removing at least sections of the first electrically conductive coating in at least one surface area for forming at least one insulating area in order to form at least one first segment of the first electrically conductive coating; alternatively or in addition to removing the first electrically conductive coating, the insulating area can also be formed by interrupting the first electrically conductive coating, for example using a knife, scraper and/or laser;

applying at least one electroconductive conductor path in the insulating area, such that the electroconductive conductor path extends from the first segment in the insulating area, or at least over sections of the first electrically conductive coating, to a contacting area. Alternatively or additionally, it is possible that the electroconductive conductor path is not applied directly in the insulating area, but the first electrically conductive coating is structured in such a way that it is preserved where the conductor path extends and is nevertheless preferably electrically insulated from the other segments. The electrically conductive coating can be structured by cutting and/or lasering, for example. The conductor path can then be applied to an area of the electrically conductive coating that remains after structuring.

applying at least one connecting conductor path to the second support film such that the at least one connecting conductor path extends from a busbar of the contacting area to an electrical terminal of the shading arrangement;

connecting the electrical terminal to the second electrically conductive coating via an electroconductive connecting element. The electrical terminal is formed on an outer surface of the second support film. The outer surface of the second support film is a main surface of the second support film which is disposed on the side of the first support film opposite to the liquid crystal arrangement. In other words, the outer surface of the second support film corresponds to the main surface of the second support film which is disposed on the side of the first support film opposite to the liquid crystal arrangement. The connection can be formed in particular by disposing and/or plugging on a connecting terminal and/or by forming a recess in the second support film up to the second electrically conductive coating and by introducing, in particular by filling with, an electroconductive material in order to contact the second electrically conductive coating. The recess and/or the electrical terminal are preferably formed on an edge area of the second support film. Purely optionally, the liquid crystal arrangement can be segmented. Particularly preferably, however, at least one of the two electrically conductive coatings is segmented.

It is understood that the steps of the method do not necessarily have to be carried out in the order shown. Further steps can also be carried out between the steps of the method. In addition, the individual steps of the method may have one or more sub-steps.

The first segmented electroconductive coating can be completely exposed. However, it is preferred if parts and/or sections of the first segmented electrically conductive coating are exposed. It is understood that the first segmented electroconductive coating and/or the intermediate segmented liquid crystal layer can each have corresponding segments, i.e., the individual segments of the first segmented electrically conductive coating and/or the preferred segments of the intermediate segmented liquid crystal layer do not overlap. It is understood that further segments may also be present. It is also understood that the first electrically conductive coating does not have to be removed completely, but that only part of the first electrically conductive coating can be removed. For example, the first and/or the second segment can also comprise a course of the conductor path applied later, but be electrically insulated from each other. In this case, the conductor path is applied to the first electrically conductive coating. The path along which the respective conductor path is to be applied therefore does not necessarily have to be removed from the first electrically conductive coating according to the invention, but can remain in place, whereby such a segment is nevertheless electrically insulated from another segment by removing at least sections of the first coating. The electroconductive conductor paths are therefore particularly preferably applied to the insulating area and/or the first electrically conductive coating. It is also understood that the first electrically conductive coating does not necessarily have to be (pre-) segmented, but can also be segmented before it is provided. The second coating is preferably not segmented. It is only advantageous that one of the two coatings is segmented so that the roller blind function and/or the segment-by-segment switching of the film can be implemented. Depending on the embodiment, in particular of the material of the liquid crystal arrangement, a segmented second coating may preferably be provided, for example in the case of LC.

The connecting conductor path can comprise a conductive, in particular flexible contact strip, which can be made of copper and/or silver and/or gold and/or aluminum. The connecting conductor path can comprise an electroconductive grid and/or cable and/or a wire and/or a ribbon cable and/or a foil, which is preferably applied to the first support film.

The invention thus relates to a contacting solution for forming an electrical connection and/or contact with a preferably already pre-segmented functional-layer blank in order to be able to energize it segment by segment in its intended use. In this way, a functional-layer arrangement can be formed with a functional-layer blank contacted in accordance with the method, said functional-layer arrangement being switchable and/or energizable segment by segment in the application. A roller blind function can thus be provided, for example.

The exposure of the first segmented electrically conductive coating in at least one surface area can preferably be provided in any way. For example, the surface area can be created by cutting the second support film together with the underlying PDLC layer (also known as kiss cutting). Subsequently, residues of the PDLC layer on the first segmented electrically conductive coating can still be removed by cleaning.

According to the invention, at least sections and/or parts of the first segmented electrically conductive coating are decoated in order to form the insulating area so that the individual PDLC segments can ultimately be energized segment by segment. The first support film and the second support film preferably comprise PET.

The invention offers the following advantages over the existing contacting solution. On the one hand, the proposed contacting solution, in particular by providing the busbar, the connecting conductor path and the electrical terminal, enables a one-sided, in particular simultaneous, contacting of the first and the second electrically conductive coating. This eliminates the need to rotate the functional-layer blank, which simplifies the manufacturing process. The electrical terminal makes it possible to contact the second electrically conductive coating without having to rotate and/or turn the functional-layer blank. Since the second electrically conductive coating is preferably not segmented, one electrical terminal is sufficient to contact the electroconductive coating. The electrode potential can preferably be contacted in such a way that a common connection is possible. The functional-layer blank contacted according to the invention can be provided as a self-contained, functioning system which in particular functions independently of surrounding components. The electrical terminal can, for example, still comprise a protective film prior to attachment to the functional-layer blank, said protective film being removed from the electrical terminal for attachment. Such a protective film can be provided, for example, by a plastic film that is applied to a contact area of the electrical terminal in order to protect it before it is attached. The electrical terminal can be attached semi-automatically or automatically, for example by a robot and/or a gripper system and/or a CNC machine with a gripper system. The electrical terminal can be attached by using solder and/or a welding process to permanently connect the electrical terminal to the second electrically conductive coating, in particular if the electrical terminal is not already functional. In the case that the electrical terminal is not preformed or if the electrical terminal is a flexible connector, it can be wrapped around an edge of the second support film. The wrapping can be done by a robot and/or a gripper system and/or a CNC machine with a gripper system.

In one embodiment, removing at least sections of the first segmented electrically conductive coating comprises a decoating by a laser and/or an etching by an etching agent and/or by a mechanical removal, in particular by means of a brush. The first coating can also be removed abrasively. Removal by laser or etching is advantageous due to the achievable structural accuracy. Mechanical removal, e.g., using a rotating brush, is cost-effective in contrast. In principle, mechanical removal can also be achieved by scoring with a knife. This is a particularly simple way of isolating individual segments and requires a simpler manufacturing structure. For example, a CO2 laser can also be used for removal. The laser is preferably operated in continuous wave mode, but can also be operated in pulsed mode. The laser power is preferably 100 W to 500 W, particularly preferably 200 W to 300 W. For decoating, the laser beam is preferably focused on the first segmented electroconductive coating, thus ensuring a high power density and a thin cutting line.

In one embodiment, the first support film and/or the second support film comprises a plastic material and is preferably made of and/or formed from PET. Other plastic support materials, such as PVC and/or PU, PE are also possible.

The liquid crystal arrangement can be formed in segments or can be segmented. The segments of the liquid crystal arrangement can, for example, be adapted to segments of the first and/or second electrically conductive coating, so that, for example, in projection onto a main surface of the liquid crystal arrangement, at least a partial area of a boundary region of a segment of the liquid crystal arrangement is aligned with a boundary region of the first and/or second conductive coating.

In one embodiment, the first electrically conductive coating and/or the second electrically conductive coating comprises an ITO layer. The first segmented electroconductive coating and/or the second conductive coating preferably comprise indium tin oxide (ITO). Other electroconductive coatings can also be used.

In one embodiment, the at least one electroconductive conductor path and/or the at least one connecting conductor path is/are printed on and/or applied by means of an electroconductive ink and/or an electroconductive. The applying of the at least one electroconductive conductor path and/or the at least one connecting conductor path also preferably comprises a printing an electroconductive paint and/or ink and/or an application of an electroconductive paste and/or ink on the at least one insulating area and/or the first electrically conductive coating and/or the first support film. Particularly preferably, such an ink and/or paint and/or paste comprises a high flexibility as well as a special suitability for printing on, for example, PET or on, for example, coated PET substrates by means of ITO or on other preferably flexible substrates. As a result, the printed and/or applied conductor paths are not damaged during further production and/or further production steps of the functional-layer blank, even if it is bent and/or curved.

In one embodiment, at least one stencil and/or a print mask and/or a digital printing process is used is used for printing and/or applying. This allows a structured and predefined shape of the conductor paths to be achieved. In addition, the conductor paths can also have complex trajectories.

In one embodiment, the at least one electroconductive conductor track is guided in a mutually structured course to the in particular common contacting area, which is preferably arranged at an end portion of the surface area. The contacting area preferably also serves as an electrical contact for the second electrically conductive coating.

In one embodiment, the second support film including the second electrically conductive coating and the liquid crystal arrangement is stripped and/or removed in the exposed surface area. Said removing is preferably carried out by means of cutting out and, in particular, by subsequently peeling off. It should be mentioned that the electroconductive coating preferably has a comparatively stronger adhesive and/or cohesive bond to the support film than to the liquid crystal arrangement. Alternatively or additionally, the support film and/or the support film, in particular together with the second electrically conductive coating and/or the liquid crystal arrangement, can also be removed by ablation and/or etching. In particular, cleaning is provided after the removal.

In one embodiment, a contact portion is formed at a respective end portion of the respective conductor path disposed in the contacting area, said contact portion being widened relative to a width of the respective conductor path. In other words, the at least one electroconductive conductor path widens in the at least one contacting area to a contact point or to the respective contact portion. The preferably parallel printing and/or applying of the conductor paths for contacting each individual segment is preferably carried out together with the printing and/or applying of the preferred contact portions in the contacting area.

In one embodiment, the contacting area comprises a connector, in particular a flexible circuit board (FPCB), by means of which the functional-layer blank and/or the shading arrangement is connectable to a voltage source. Starting from the contacting area, for example, a connection can be made to a flexible connector, in particular to an FPBC. In other words, preferably in the contacting area, an in particular flexible power supply cable and/or an in particular flexible connector is connected to the respective conductor paths, in particular individually or collectively, by welding, in particular by ultrasonic welding and/or by thermal welding and/or by soldering and/or by gluing and/or by clamping. An FPCB is preferably welded to the printed contact points using ultrasonic welding. For example, a plug-in and/or clamp connection can be provided for the electrical connection between the contacting area and an electrical line, such as a cable, so that the contacting area itself or another component that is disposed in the contacting area is designed accordingly.

In one embodiment, an edge seal is provided at least in sections and/or parts of an edge area of the exposed surface area. The edge seal is also known as edge sealing. The edge area is preferably used to prevent the diffusion of oxygen into the liquid crystal arrangement at the exposed edge by sealing it. Particularly preferably, the at least one connecting conductor path extends over the preferably stepped edge area.

In one embodiment, the electrical terminal comprises a preferably metallic connecting terminal which is disposed on the second support film and which is configured to contact the second electrically conductive coating. The size of the electrical terminal is generally arbitrary. For example, the width of the electrical terminal can range from a few mm to several cm. The material thickness of the electrical terminal can range from a few μm to several mm. Particularly preferably, in an exemplary embodiment, the electrical terminal comprises a clamping function and is preferably U-shaped. The electrical terminal can be provided, for example, as a preformed connector and/or as a rigid connector. The electrical terminal can be connected to the second electrically conductive coating by clamping. Alternatively or additionally, the electrical terminal can also be adhesively bonded. Adhesive bonding is preferably carried out using a conductive adhesive, which can be pre-laminated on the electrical terminal, for example. Alternatively or additionally, the electrical terminal can also be attached by mechanical clamping in combination with adhesive bonding. It is also possible to attach the electrical terminal to the support film and thus bond it to the second electrically conductive coating by soldering, laser welding, ultrasonic welding, ultrasonic soldering, resistance welding, friction welding and/or by bonding using silver paste. Even if a clamp or a terminal is described here, any electroconductive component which grips the second electrically conductive coating and guides it onto the surface of the second support film opposite the electroconductive coating, in particular over an edge area, and which is disposed on the second support film in a form-fitting or materially connected manner can be used as a connector.

In one embodiment, the first support film, the first electrically conductive coating, and the liquid crystal arrangement are at least partially removed, in particular slotted, in a terminal area of the electrical terminal. The electrical terminal preferably engages in this at least partially removed area in order to contact the second electroconductive layer. The removal can be carried out by mechanical cutting and/or by cutting using a laser. In one embodiment, the first support film, the first electrically conductive coating, and the liquid crystal arrangement each have an opening in the terminal area, the openings being aligned.

In one embodiment, the connecting terminal is force-fittingly connected to the second support film and contacts the second electrically conductive coating in this manner. Alternatively or additionally, a form-fitting and/or frictionally engaged connection is also conceivable.

In one embodiment, the at least one electroconductive conductor path is flexible after printing on the insulating area. This is advantageous compared to the prior art in that even if the functional-layer blank is bent, the conductor path does not come off and the functional-layer contact is not damaged as a result.

In one embodiment, the at least one electroconductive conductor path is pre-dried after in particular intense pulsed light (IPL) has been applied. Pre-drying can also be carried out using a laser or carried out thermally using hot air and/or infrared and/or an oven and/or UV radiation. The optional pre-drying of the ink and/or the paint and/or the paste is carried out in order to achieve improved handling stability. IPL has the advantage of a short cycle time, as only a short energy input time is required. Compared to thermal drying, only a few seconds, e.g., 10-30 seconds, are required, whereas a cycle time of approx. 2-30 min can be expected with thermal drying. Pre-drying and possibly post-drying, in particular in an autoclave, can have a positive effect on the production time and/or the cycle time.

In one embodiment, at least the following steps are performed to provide the processed functional-layer blank: heating the functional-layer blank on the side of the first support film and detaching a defined area of the second support film together with a portion of the liquid crystal layer adhering in this area from the first support film so that the first conductive coating of the first support film is exposed in a surface area corresponding to the detached area of the second support film, preferably without residues of the liquid crystal layer. The first conductive coating is preferably freed from the liquid crystal layer without leaving any residue.

Experience has shown that by heating one or both sides or the functional-layer blank, the other side of the functional-layer blank can be separated as a unit with the liquid crystal layer or mass due to the reduced adhesive forces between the liquid crystal layer and the conductive coating of the first support film. The cohesive forces in the liquid crystal layer and the adhesive forces between the liquid crystal layer and the electrically conductive coating of the second support film remain intact. This makes it possible to remove the liquid crystal layer from the electrically conductive coating of the first support film without damaging its electroconductive coating. The removal process can be carried out quickly and with a high level of operational safety because no solvents need to be used. High reproducibility is also guaranteed. The defined area of the second support film is reproducible, so that rapid industrial implementation of the process according to the invention is also possible.

For example, the functional-layer blank is a blank of a film composite which is formed from the first support film with the first electrically conductive coating, the second support film with the second electrically conductive coating, and the liquid crystal layer disposed between them. The cutting of the functional-layer blank can be integrated into the method according to the invention.

After carrying out the preferred method, the resulting functional-layer blank processed in this way can be further processed according to the invention. The exposed first electroconductive coating and the second electrically conductive coating can be contacted according to the invention, so that a connection of the same to a control system is possible, and the functional-layer arrangement can be integrated into the sandwich structure of a vehicle window. In this way, the functional-layer arrangement can be disposed between two window bodies, for example. The sandwich structure of the vehicle window can comprise further plastic films and/or layers that are disposed on one or more window bodies and/or comprise an ambient light functionality. For example, between an outer window body and/or between an inner window body and the first or second support film, at least one hot-melt adhesive film and/or a functional coating, e.g., for reflecting or absorbing light of a certain wavelength, is disposed. In particular, it can be intended that hot-melt adhesive films, for example those formed from PVB (polyvinyl butyral), are disposed between an inner and outer window body, the functional layer being directly or indirectly disposed by means of at least one such hot-melt adhesive film on one of the inner or outer window bodies. An alternative to PVB would be a layer or film made of TPU (thermoplastic polyurethane), EVA (ethylene vinyl acetate) or a liquid cross-linking polymer compound.

In a particular embodiment of the process according to the invention, the functional-layer blank on the side of the first support film is heated such that the first support film has a temperature of 60° C. to 220° C., in particular a temperature of 60° C. to 150° C. and preferably a temperature of 60° C. to 100° C. These temperature ranges are suitable in particular when using a PET film as a support film whose melting temperature is around 260° C.

The invention further relates to a shading arrangement, in particular a functional-layer arrangement, particularly preferably a PDLC arrangement or an LC arrangement, which comprises the at least one functional-layer blank according to any embodiment of the invention. The shading arrangement can be switched between a blocking state and a transmission state by the preferably applied electrical voltage. The shading arrangement preferably operates at a nominal voltage of 10 to 100 volt, particularly preferably of 30 to 60 volt.

Furthermore, the invention relates to a vehicle window having a shading arrangement of this kind. In particular, the vehicle window designed in this way is suitable as a window of a vehicle roof, said window being a part of a fixed roof element that is rigidly disposed relative to a vehicle structure or of a ceiling element that can be displaced relative to the vehicle structure by means of a corresponding drive kinematic unit.

Further advantages and advantageous embodiments of the subject matter of the invention can be found in the description, the drawing and the patent claims.

BRIEF DESCRIPTION OF DRAWINGS

An exemplary embodiment of a method according to the invention will be described in detail below with reference to the drawing.

DETAILED DESCRIPTION

Figure 1:
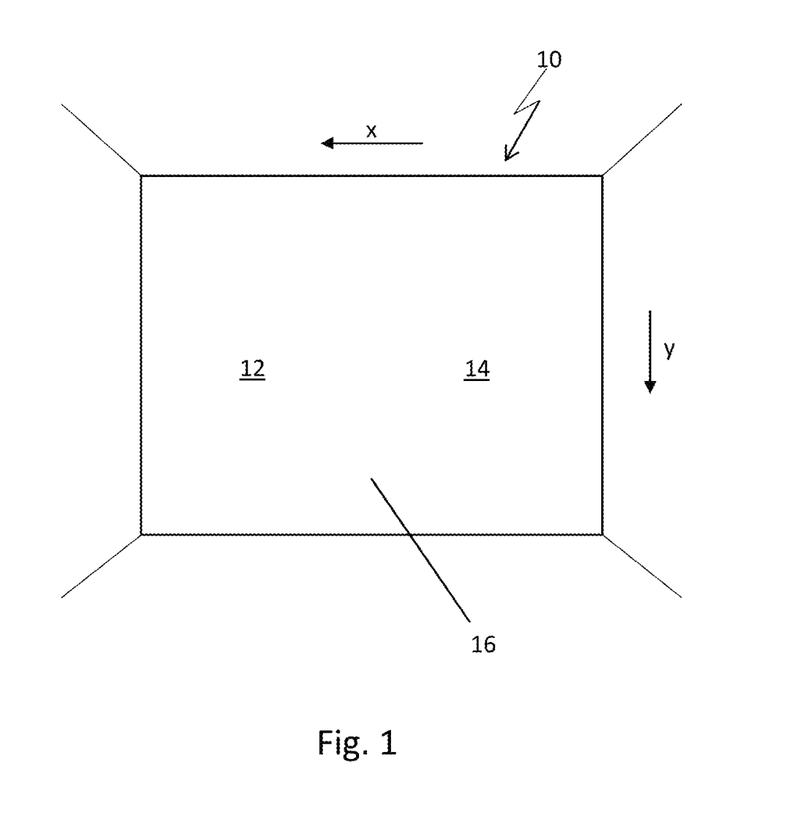
FIG. 1 shows a schematic view of a roof area of a motor vehicle.

FIG. 1 shows a motor vehicle 10, which comprises a vehicle roof 12, which is provided with a fixed roof element 14 rigidly or fixedly connected to a vehicle body. Fixed roof element 14 forms a vehicle window with a shading function, such that the light entering the interior of motor vehicle 10 can be controlled via the fixed roof element. Vehicle roof 12 extends along a longitudinal vehicle direction x and a vehicle width direction y. Longitudinal vehicle direction x is orthogonal to vehicle width direction y.

Figure 2:
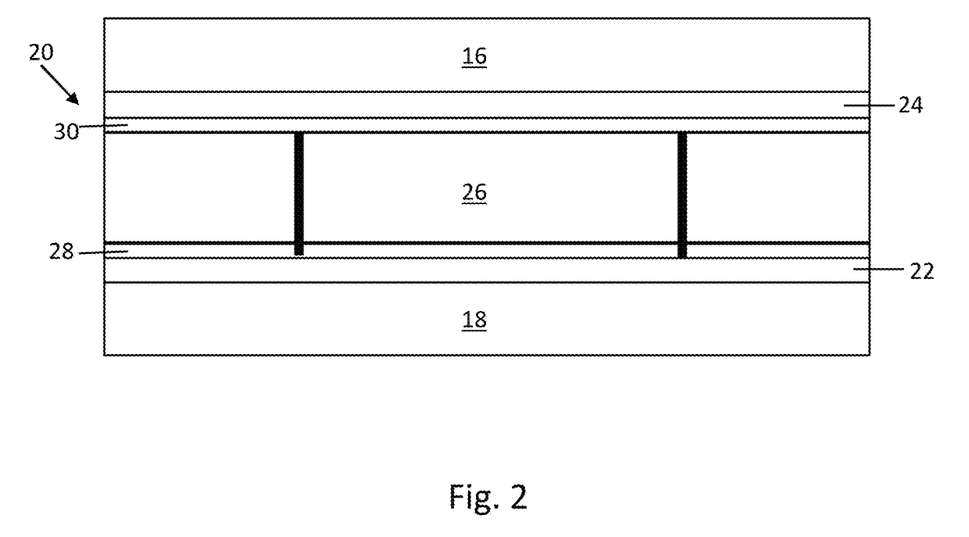
FIG. 2 shows a cut through a window of the vehicle roof.

Fixed roof element 14 has a sandwich structure, which is shown schematically in FIG. 2 and which comprises an outer window body 16, which forms an outer viewing area of fixed roof element 14 facing the vehicle environment, and an inner window body 18, which forms an inner viewing area of fixed roof element 14 accessible from the vehicle interior. A shading arrangement 20, in particular a PDLC arrangement (polymer dispersed liquid crystal arrangement), is provided between outer window body 16 and inner window body 18, said shading arrangement 20 representing a shading system of fixed roof element 14. Shading arrangement 20 is connected to outer window body 16 and inner window body 18 via adhesive layers (not shown), which are made of PVB (Polyvinylbutyral). Alternatively, adhesive layers can comprise TPU, EVA or a liquid cross-linking polymer compound.

Shading arrangement 20 comprises a first support film 22 and a second support film 24. An exemplary segmented liquid crystal arrangement 26, for example a PDLC layer or a PDLC mass, is disposed between two support films 22 and 24 which forms the functionally effective element of shading arrangement 20. The liquid crystal arrangement does not necessarily have to be segmented, but can also be continuous in other embodiments. Support films 22 and 24, which can each be formed from a material such as PET or the like, each have an electroconductive, preferably transparent, coating 28 or 30 on the side facing liquid crystal arrangement 26, said coating 28 or 30 forming an electrode layer and being formed in the present case from an ITO coating (indium tin oxide coating). Other electroconductive coatings are also conceivable. First electroconductive coating 28 is preferably segmented. Second electroconductive coating 30 is preferably not segmented. The segmentation of first electrically conductive coating 28 and liquid crystal arrangement 26 is indicated by vertical lines in FIG. 2. The segmentation can be carried out, for example, by removing coating 28 and/or by cutting through liquid crystal arrangement 26 with a laser. In this case, a $CO_2$ laser can be used, for example. In FIG. 2, a total of three segments can be seen, the designation using the respective reference signs being applied once for reasons of clarity.

By means of first segmented electroconductive coating 28, a voltage can be applied to liquid crystal arrangement 26 by means of a control unit (not shown), so that the transmission behavior of liquid crystal arrangement 26 can be changed. This means that liquid crystal arrangement 26 or shading arrangement 20 can be adjusted between a blocking state, in which liquid crystal arrangement 26 strongly scatters light due to the non-directional liquid crystals, and a transmission state, in which parts of the light can enter the vehicle interior in an unscattered manner through the vehicle window. Liquid crystal arrangement 26 forms the actual shading element and comprises a polymer matrix in which liquid crystals are integrated in the form of droplets.

To enable the individual shading arrangement segments to be energized and/or controlled, they must preferably be individually electrically contacted. For example, first support film 22 of shading arrangement 20 has a greater width in vehicle width direction y of fixed roof element 14 than second support film 24, so that one surface area 31, which is formed as a contact strip (see an exemplary section of such a surface area 31 in FIG. 3), of first support film 22 is exposed in each of the lateral edge areas. In other embodiments, surface area 31 can also be provided in an inner area of support film 24. It is understood that the width can also be the same. The width of the respective support film preferably depends on the width of the generated kiss cut for the negative and/or the positive electrode. It is understood that the width can also be the same. The width of the respective support film preferably depends on the width of the generated kiss cut for the negative and/or the positive electrode. According to the invention, first segmented electroconductive coating 28 can be contacted segment by segment via this respective exposed surface area 31 and can be connected to the control unit (not shown) via a flexible connector 29. A total width preferably corresponds to the width of the support films disposed on top of each other.

When manufacturing shading arrangement 20 or preparing it for contacting and laminating the sandwich structure shown in FIG. 2, a functional-layer blank 32 is preferably provided first. Said functional-layer blank 32 preferably has the dimensions of first support film 22 in the installation position of shading arrangement 20. A so-called kiss cut process is then preferably carried out on functional-layer blank 32, in which second support film 24 is cut along a cutting line S without the cutting process placing any mechanical stress on first support film 22 and coating 28 thereof.

Functional-layer blank 32 is then heated, preferably on the side of first support film 22, so that the first support film assumes a temperature of approximately 80° C. to 100° C. The heating can also be carried out on the side of second support film 24 or on both sides. By means of a corresponding separating tool (not shown), the area defined by cutting line S and the section of liquid crystal arrangement 26 adhering to second support film 24 in this area can be detached from first support film 22 and its coating 28, in particular without leaving any residue, so that exposed surface area 31 of coating 28 of first support film 22 results in the edge area. This process is preferably carried out along a lateral edge (viewed in longitudinal vehicle direction x) of functional-layer blank 32, so that a functional-layer blank 32' processed in this way is provided with a surface area 31 exposed in the edge area.

To contact the individual segments of first electrically conductive coating 28, at least sections of segmented electrically conductive coating 28 are removed, at least in exposed surface area 31, to optionally form at least one insulating area 34, through which the individual segments of first segmented electrically conductive coating 28 are optionally electrically insulated from one another. Removing at least sections of first segmented electrically conductive coating 28 comprises, for example, decoating by means of a laser and/or etching by means of an etchant. A mechanical removal by means of a knife is also possible, for example. The segments are preferably not separated from each other by insulating area 34. Insulating area 34 is preferably provided in order to avoid any electrical connection between individual conductor paths 36. By forming insulating area 34, it is also possible to contact the individual connection points of the segments of coating 28 segment by segment by means of applied conductor paths 36.

Figure 3:
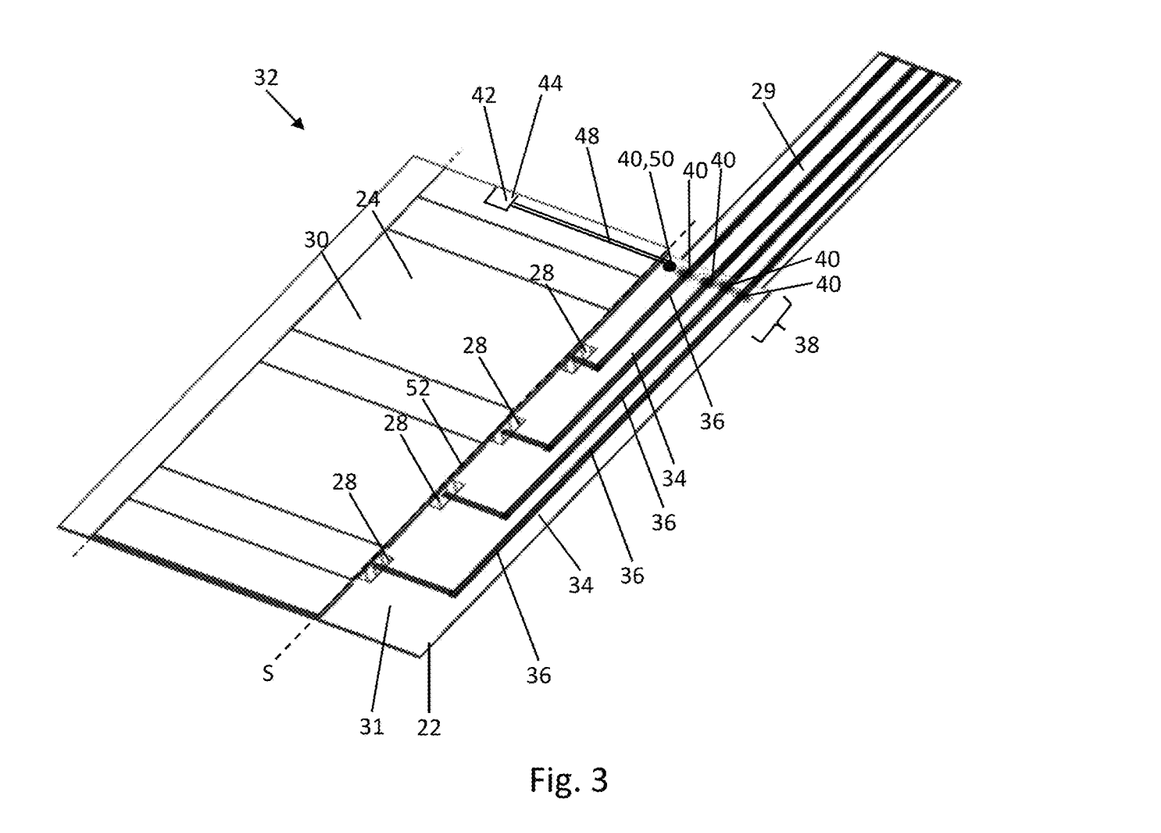
FIG. 3 shows a schematic view of a functional-layer blank.

According to the invention, at least one electroconductive conductor path 36 (in the present case, a plurality of conductor paths) is also applied to at least one insulating area 34, wherein each individual segment of first segmented electrically conductive coating 28 is electrically contacted by a conductor path 36. One conductor path 36 preferably contacts one segment each. Conductor path 36 preferably extends from the first segment, in other words, from the first segmented conductive coating, to the common contact area. Applying the at least one electroconductive conductor path 36 comprises printing an electroconductive paint and/or ink and/or applying an electroconductive paste and/or ink to at least one insulating area 34. A stencil and/or a print mask can be used. A digital printing process can also be used. As shown in FIG. 3, the electroconductive conductor paths 36 are disposed so as to be mutually structured and are guided to a common contacting area 38. Contacting area 38 is disposed on a corner end portion of exposed surface area 31. Printed on and/or applied conductor paths 36 are preferably flexible and are preferably pre-dried after they have been printed on and/or have been applied. Of course, complete drying and/or curing is also possible.

A contact portion 40, which is preferably widened relative to a width of the respective conductor path 36, is formed on a respective end portion of respective conductor path 36, the end portion being disposed in contacting area 38. In the present case, respective contact portion 40 is printed on as a contact point.

Figure 4:
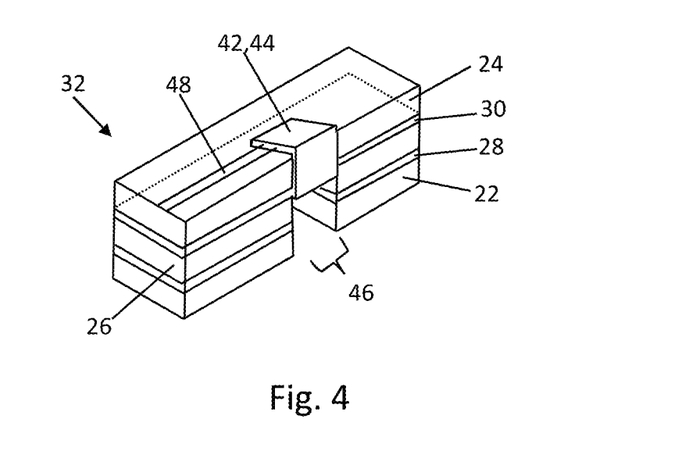
FIG. 4 shows a schematic view of a functional-layer blank.

For contacting second electrically conductive coating 30, an electrical terminal 42 is provided in the present case, which is shown in detail in FIG. 4. Electrical terminal 42 preferably comprises an in particular metallic connecting terminal 44, which is disposed on second support film 24 and is designed to contact second electrically conductive coating 30. First support film 22, first electrically conductive coating 28, and liquid crystal arrangement 26 are at least partially removed, in particular slotted, in a terminal area 46 of electrical terminal 42, as can be seen in FIG. 4. In the present case, connecting terminal 44 is force-fittingly and/or form-fittingly and/or materially connected to second support film 24 and contacts second electrically conductive coating 30 in this way. Alternatively or additionally, electrical terminal 42 can also be adhesively bonded to second electrically conductive coating 30 or be otherwise electrically connected thereto.

In the present case, electrical terminal 42 is led through a connecting conductor path 48 to a busbar 50, which is provided in contacting area 38. In an area of busbar 50, connecting conductor path 48 is preferably widened so that it also forms a contact portion 40. The at least one connecting conductor path 48 is printed on and/or applied by means of an electroconductive ink and/or paste and/or an electroconductive paint. Connecting conductor path 48 can also be applied to second support film 24 and preferably does not have to be routed via the edge area into contacting area 38. Contacting by means of electrical terminal 42 can optionally be made at the level of second support film 24.

Preferably, an in particular flexible connector 29, for example a FPCB, is disposed in contacting area 38 or on the respective contact portions 40. The arrangement can be executed by ultrasonic welding or soldering or ultrasonic soldering or crimping or by plugging or gluing. The individual segments can be electrically connected to a voltage source and/or a control unit via connector 29 in order to switch them, in particular individually.

Particularly preferably, an edge seal 52 is provided at least in sections of an edge area of exposed surface area 31. At least one connecting conductor path 48 extends over the preferably stepped edge area towards busbar 50.

Figure 5:
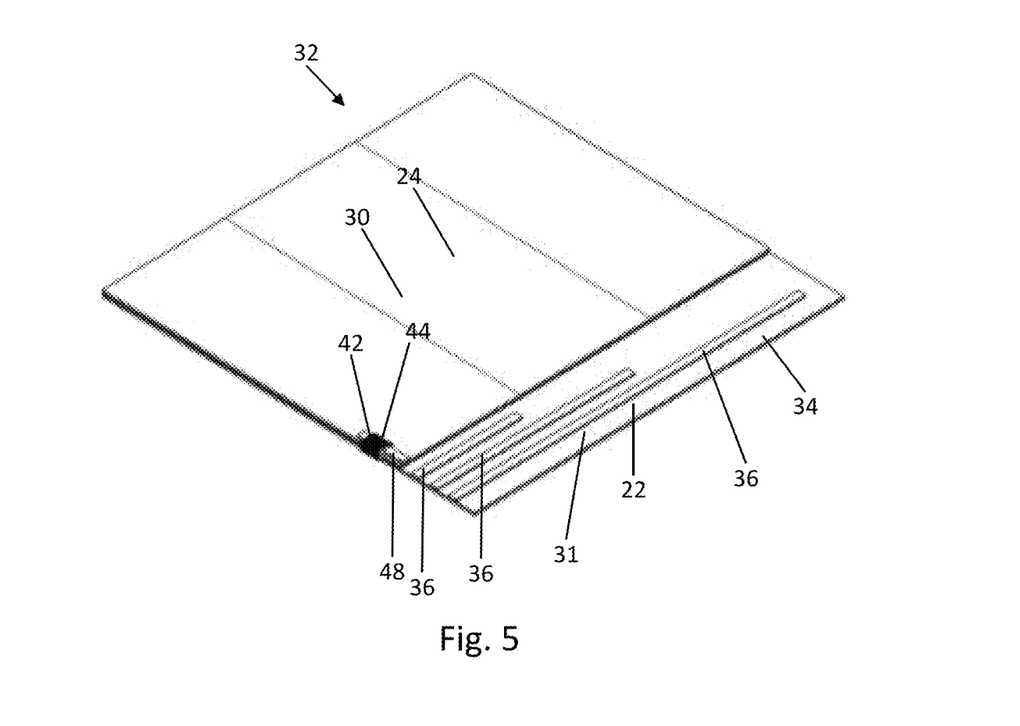
FIG. 5 shows a schematic view of a functional-layer blank.
Figure 6:
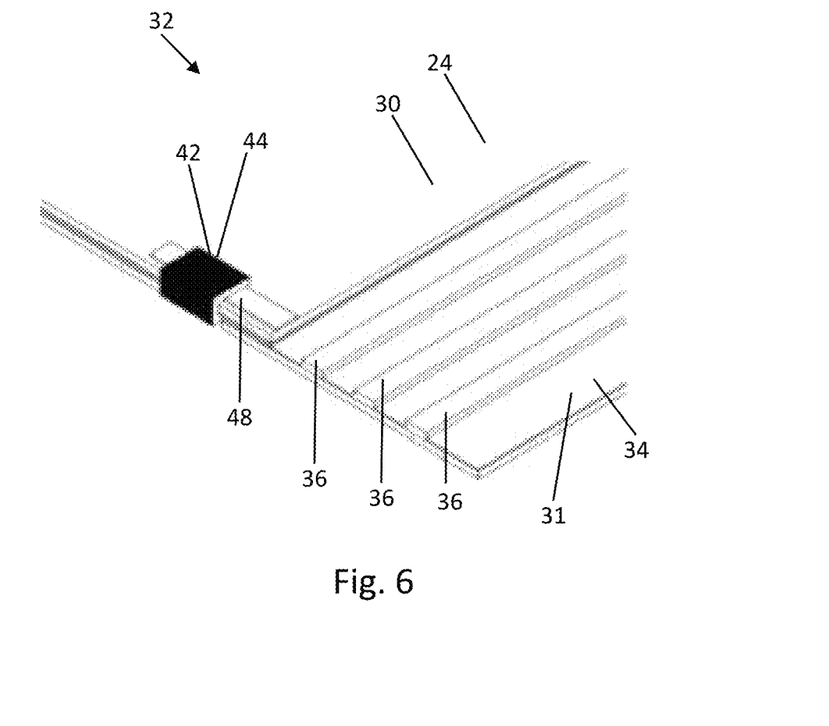
FIG. 6 shows a detailed schematic view of a functional-layer blank

FIG. 5 shows another embodiment of a functional-layer blank 32. FIG. 6 shows a detailed view of the embodiment shown in FIG. 5. Electrical terminal 42 formed as metallic connecting terminal 44, which is disposed on second support film 24 and contacts both second electrically conductive coating 30 and connecting conductor path 48. In principle, connecting conductor path 48 can be provided with an electrical terminal, however, this is not shown in detail in FIGS. 5 and 6.

LIST OF REFERENCE SIGNS 10 motor vehicle
12 vehicle roof
14 fixed roof element
16 outer window body
18 inner window body
20 shading arrangement
22 support film
24 support film
26 liquid crystal arrangement
28 coating
29 connector
30 coating
31 surface area
32 functional-layer blank
32' processed functional-layer blank
34 insulating area
36 conductor paths
38 contacting area
40 contact portion
42 electrical terminal
44 connecting terminal
46 terminal area
48 connecting conductor path
50 busbar
52 edge seal
x longitudinal vehicle direction
y vehicle width direction
S cutting line

The invention claimed is:

1. A functional-layer blank which is used with a vehicle window in a polymer-dispersed liquid crystal shading arrangement, said functional-layer blank comprising:
   a first support film having a first electrically conductive coating,
   a second support film having a second electrically conductive coating, and
   a liquid crystal arrangement, which is disposed between the two electrically conductive coatings,
wherein
   the first electrically conductive coating is exposed in at least one surface area and at least sections of said first electrically conductive coating are removed in the exposed surface area for forming at least one insulating area in order to form at least one first segment of the first electrically conductive coating, said first segment being electrically insulated from the surrounding first electrically conductive coating by the insulating area,
   at least one electroconductive conductor path extending from the first segment in the insulating area to a contacting area formed for forming electrically contacting the shading arrangement,
   the contacting area comprising a busbar which is connected to an electrical terminal of the shading arrangement by at least one connecting conductor path, the second electrically conductive coating being contacted by said electrical terminal, and
   at least sections of the at least one connecting conductor path being printed on and/or applied to the second support film.

2. The functional-layer blank according to claim 1, wherein the first support film and/or the second support film comprise(s) a plastic material.

3. The functional-layer blank according to claim 2, wherein the plastic material is PET.

4. The functional-layer blank according to claim 1, wherein the first electrically conductive coating and/or the second electrically conductive coating comprises an ITO layer.

5. The functional-layer blank according to claim 1, wherein the at least one electroconductive conductor path and/or the at least one connecting conductor path are/is printed on and/or applied by an electroconductive ink and/or an electroconductive paint.

6. The functional-layer blank according to claim 1, wherein the second support film along with the second electrically conductive coating and the liquid crystal arrangement is stripped and/or removed in the exposed surface area.

7. The functional-layer blank according to claim 6, wherein an edge seal is provided at least in sections of an edge area of the exposed surface area.

8. The functional-layer blank according to claim 7, wherein the at least one connecting conductor path extends over the stepped edge area.

9. The functional-layer blank according to claim 1, wherein the at least one electroconductive conductor path broadens to a contact portion in the at least one contacting area.

10. The functional-layer blank according to claim 1, wherein the contacting area comprises a connector, in particular a flexible circuit board (FPCB), by means of which the functional-layer blank and/or the shading arrangement are/is connectable to a voltage source.

11. The functional-layer blank according to claim 1, wherein the electrical terminal comprises a metallic connecting terminal which is disposed on the second support film and which is configured to contact the second electrically conductive coating.

12. The functional-layer blank according to claim 11, wherein the first support film, the first electrically conductive coating and the liquid crystal arrangement are at least partially removed, in particular slotted, in a terminal area of the electrical terminal.

13. The functional-layer blank according to claim 11, wherein the connecting terminal is connected to the second support film in a force-fitting manner and contacts the second electrically conductive coating in this manner.

14. A shading arrangement, in particular a polymer-dispersed liquid crystal arrangement or an LC arrangement, which comprises a functional-layer blank according to claim 1.

15. A vehicle window having a shading arrangement according to claim 14.

16. The functional-layer blank of claim 1, wherein the first electrically conductive coating is segmented; and the liquid crystal arrangement is segmented.

17. A method for contacting a functional-layer blank which is used with a vehicle window in a shading arrangement, in particular a polymer-dispersed liquid crystal arrangement, said method comprising the following steps:

providing a processed functional-layer blank which comprises a first support film having a first segmented, electrically conductive coating, a second support film having a second electrically conductive coating, and a segmented liquid crystal arrangement which is disposed between the two electrically conductive coatings, removing at least sections of the first electrically conductive coating in at least one surface area for forming at least one insulating area in order to form at least one first segment of the first electrically conductive coating, applying at least one electroconductive conductor path in the insulating area, such that the electroconductive conductor path extends from the first segment in the insulating area to a contacting area, applying at least one connecting conductor path to the second support film such that the at least one connecting conductor path extends from a busbar of the contacting area to an electrical terminal of the shading arrangement, and connecting the electrical terminal, in particular by disposing and/or plugging on a connecting terminal, in order to contact the second electrically conductive coating.

\* \* \* \* \*